W. V. TURNER.
FLUID PRESSURE BRAKE.
APPLICATION FILED JUNE 28, 1915.
1,179,479.
Patented Apr. 18, 1916.
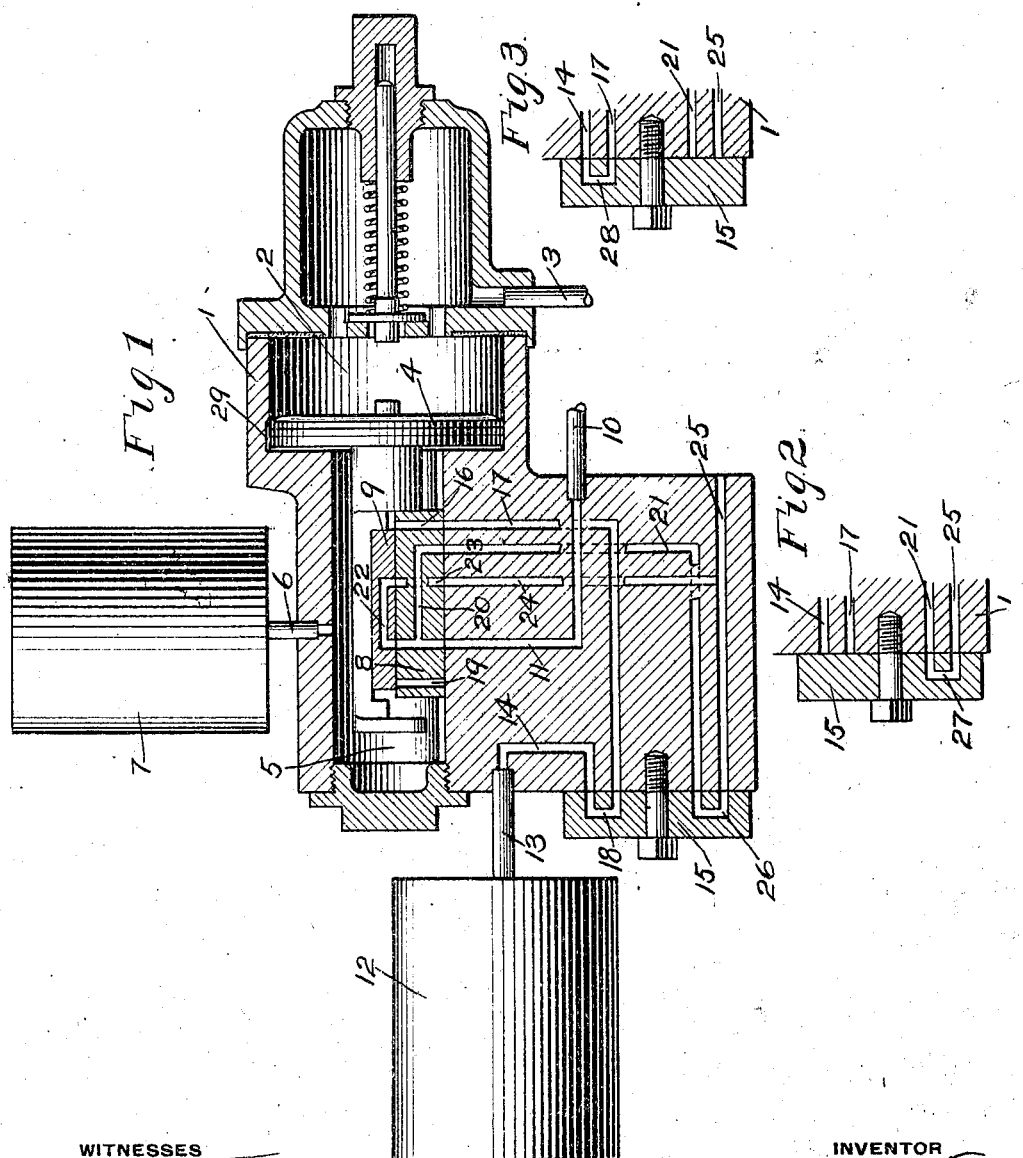

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,179,479.

Specification of Letters Patent. Patented Apr. 18, 1916.

Application filed June 28, 1915. Serial No. 36,630.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake equipment employing a supplemental reservoir for obtaining graduated release.

It has heretofore been proposed to provide means for graduating the release of the brakes, comprising a supplemental reservoir adapted to be normally charged from the brake pipe and arranged to supply fluid under pressure to the valve chamber side of the triple valve piston upon movement to release position under an increase in brake pipe pressure. The increase in pressure thus produced effects the movement of the triple valve piston and the graduating valve so as to cut off the release of fluid from the brake cylinder and thus permit of graduating the release of the brakes.

This supplemental reservoir also serves as a means for quickly recharging the auxiliary reservoir, since upon movement to release position, if the auxiliary reservoir pressure has been reduced, fluid from the supplemental reservoir will flow to the auxiliary reservoir in addition to the usual flow from the brake pipe through the feed groove around the triple valve piston.

It is sometimes desired to cut out the graduated release feature, for example, where only a part of the cars in a train are equipped with a brake apparatus having means for graduating the release of the brakes, but with the apparatus heretofore proposed, when the graduated release feature is cut out the quick recharge feature is also lost.

The quick recharge feature prevents excessive drainage from the brake pipe in releasing the brakes, by partly effecting the recharge of the auxiliary reservoir from the supplemental reservoir, so that a quick rise in brake pipe pressure is facilitated, and therefore it would be highly desirable to retain the quick recharge feature when graduated release is cut out.

The principal object of my invention is to provide means for accomplishing the above purpose.

In the accompanying drawing; Figure 1 is a central sectional view of a triple valve device, with my improvement applied thereto; Fig. 2 a detail sectional view, showing the position of the graduated release cap for cutting out both the graduated release and the quick recharge features; and Fig. 3 a view similar to Fig. 2, showing the position of the graduated release cap for cutting in both the graduated release and the quick recharge features.

As shown in Fig. 1 of the drawing, a triple valve device may be provided, comprising a casing 1, having a piston chamber 2 connected to brake pipe 3 and containing piston 4, and having a valve chamber 5 connected by pipe 6 to auxiliary reservoir 7 and containing a main slide valve 8 and a graduating valve 9 adapted to be operated by piston 4.

Pipe 10 leads to the brake cylinder and is connected to passage 11, leading to the seat of slide valve 8 and a supplemental reservoir 12 is connected by pipe 13 to a passage 14 which is adapted to be controlled by a graduated release cap 15. A port 16 through the main slide valve 8, registers in the release position of the slide valve with a passage 17 leading to the cap 15 and is adapted in one position of the cap to be connected by cavity 18 with the passage 14.

The main slide valve is provided with the usual service port 19 adapted in service position of the valve to register with passage 11 for supplying fluid from the auxiliary reservoir to the brake cylinder.

For controlling the release of the brakes, the main slide valve 8 is provided with a cavity 20 adapted in the release position of the valve to connect brake cylinder passage 11 with a passage 21 leading to the cap 15 and the graduating valve 9 is also provided with a cavity 22, adapted in the release position of the graduating valve to connect cavity 20 with a port 23 in the main valve 8 which registers with a passage 24 leading to an atmospheric exhaust passage 25.

In operation, if the graduated release feature is to be cut out and the quick recharge feature cut in, the graduated cap 15 is adjusted to the position shown in Fig. 1, in which cavity 18 connects passages 14 and 17 and a cavity 26 connects passages 21 and 25.

When the brake pipe is charged with fluid under pressure, air flows through the usual feed groove 29 around the triple valve piston 4 and charges valve chamber 5 and the auxiliary reservoir 7. The supplemental reservoir 12 is also charged from valve chamber 5 through port 16, passage 17, cavity 18, and passage 14.

In releasing the brakes after an application, the triple valve parts will be moved to release position, and fluid from the normally charged supplemental reservoir will be admitted through port 16 to valve chamber 5 and the auxiliary reservoir, so as to assist in quickly recharging same.

In the position of the graduating cap shown in Fig. 1, passage 21 is connected by cavity 26 to exhaust passage 25, so that fluid can exhaust from the brake cylinder through cavity 20 in the main valve 8, as well as through the usual exhaust cavity 22 in the graduating valve 9.

Should the triple valve piston 4 be moved out to graduated release position by the venting of fluid from the supplemental reservoir to valve chamber 5, while the graduating valve 9 will thus be shifted to close the brake cylinder exhaust through cavity 22, fluid from the brake cylinder can still continue to exhaust through the cavity 20 in the main slide valve 8, so that the release of the brakes will not be graduated. It will therefore be seen that with the graduated release cap 15 in the position shown in Fig. 1, the graduated release is cut out while the quick recharge feature is retained.

If both graduated release and quick recharge is desired, the cap 15 is turned to the position shown in Fig. 3, in which a cavity 28 connects passages 14 and 17 while passages 21 and 25 are blanked.

By blanking passage 21, the brake cylinder exhaust through the main slide valve is cut off, so that the only exhaust is by way of cavity 22 in the graduating valve. Consequently, since cavity 28 connects passages 14 and 17, fluid is supplied from the supplemental reservoir for quick recharge and also operates to effect the graduated release of the brakes.

In the position of the cap 15 shown in Fig. 2 of the drawing, passages 14 and 17 are blanked, so that the supplemental reservoir is cut out of action entirely and consequently neither the graduated release nor the quick recharge feature will be effective. A cavity 27 in cap 15 may connect passages 21 and 25 in this position, if it is desired to have the brake cylinder exhaust through the main valve.

Having now described my invention, what I claim as new and desire to secure by Letters Patent, is:

1. In a fluid pressure brake, the combination with a valve device for controlling the release of the brakes, of a supplemental reservoir from which fluid is adapted to be supplied to the chamber at one side of said valve device to effect a graduated release of the brakes and the quick recharge of said chamber and means for cutting out the graduated release feature while retaining the quick recharge feature.

2. In a fluid pressure brake, the combination with a brake pipe and a valve device having a piston subject to the opposing pressures of the brake pipe and a chamber for controlling the release of the brakes, of a supplemental reservoir from which fluid is supplied to said chamber in the release position of said valve device to effect the graduated release of the brakes and the quick recharge of the chamber and means for cutting out the graduated release feature while retaining the quick recharge feature.

3. The combination with a brake pipe and a valve device subject to the opposing pressures of the brake pipe and a chamber for controlling the release of the brakes, of a supplemental reservoir from which fluid is adapted to be supplied to said chamber in the release position of said valve device to effect the movement of the valve device from release to a non-release position and means adapted to be adjusted to a position for permitting the release of the brakes in said non-release position, to thereby cut out graduated release while permitting the recharge of said chamber from the supplemental reservoir.

4. The combination with a brake pipe and a valve device subject to the opposing pressures of the brake pipe and a chamber for controlling the release of the brakes and having means for graduating the release of the brakes and quickly recharging said chamber, of manually operable means having one position in which graduated release and quick recharge are cut in, and another position in which graduated release is cut out and quick recharge is cut in.

5. The combination with a brake pipe and a valve device subject to the opposing pressures of the brake pipe and a chamber for controlling the release of the brakes and having means for graduating the release of the brakes and quickly recharging said chamber, of manually operable means having one position in which graduated release and quick recharge are cut in, another position in which graduated release is cut out and quick recharge is cut in, and a third position in which graduated release and quick recharge are cut out.

In testimony whereof I have hereunto set my hand.

WALTER V. TURNER.

Witnesses:
A. M. CLEMENTS,
JOHN H. EICHER.